United States Patent
Han et al.

(10) Patent No.: US 11,822,803 B2
(45) Date of Patent: Nov. 21, 2023

(54) METHOD, ELECTRONIC DEVICE AND COMPUTER PROGRAM PRODUCT FOR MANAGING DATA BLOCKS

(71) Applicant: EMC IP Holding Company LLC, Hopkinton, MA (US)

(72) Inventors: Geng Han, Beijing (CN); Xinlei Xu, Beijing (CN); Yousheng Liu, Beijing (CN); Ruiyong Jia, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 196 days.

(21) Appl. No.: 17/308,481

(22) Filed: May 5, 2021

(65) Prior Publication Data

US 2022/0206699 A1 Jun. 30, 2022

(30) Foreign Application Priority Data

Dec. 25, 2020 (CN) .......................... 202011562733.6

(51) Int. Cl.
*G06F 3/06* (2006.01)
*H04L 9/06* (2006.01)

(52) U.S. Cl.
CPC ............ *G06F 3/0641* (2013.01); *G06F 3/067* (2013.01); *G06F 3/0619* (2013.01); *G06F 3/0659* (2013.01); *H04L 9/0643* (2013.01)

(58) Field of Classification Search
None
See application file for complete search history.

(56) References Cited

U.S. PATENT DOCUMENTS

| | | | |
|---|---|---|---|
| 10,303,390 B1 * | 5/2019 | Colgrove | G06F 11/108 |
| 10,372,695 B2 | 8/2019 | Guilford et al. | |
| 10,762,051 B1 * | 9/2020 | Bhagavandas | G06F 16/113 |
| 10,949,088 B1 | 3/2021 | Chinthekindi et al. | |
| 11,010,300 B2 | 5/2021 | Watkins et al. | |
| 2020/0117379 A1 * | 4/2020 | Pawar | G06F 3/0641 |
| 2021/0109900 A1 * | 4/2021 | McIlroy | G06F 16/1752 |

\* cited by examiner

*Primary Examiner* — Michael Alsip
(74) *Attorney, Agent, or Firm* — BainwoodHuang (57) ABSTRACT

Techniques for managing data blocks involve: generating, based on a first hash algorithm, a first fingerprint for a first block. The techniques further involve: if it is determined that there is a second fingerprint, in a fingerprint database, that is generated for a second block based on the first hash algorithm and matches the first fingerprint, determining whether there is a third fingerprint, in the fingerprint database, that is generated for the second block based on a second hash algorithm. The techniques further involve: if it is determined that the third fingerprint exists in the fingerprint database, generating a fourth fingerprint for the first block based on the second hash algorithm; and determining whether the first block and the second block are duplicate by comparing the third fingerprint and the fourth fingerprint. Such techniques can effectively reduce the overhead of identifying duplicate data blocks in data deduplication.

22 Claims, 3 Drawing Sheets

METHOD, ELECTRONIC DEVICE AND COMPUTER PROGRAM PRODUCT FOR MANAGING DATA BLOCKS

CROSS-REFERENCE TO RELATED APPLICATION

This application claims priority to Chinese Patent Application No. CN202011562733.6, on file at the China National Intellectual Property Administration (CNIPA), having a filing date of Dec. 25, 2020, and having "METHOD, ELECTRONIC DEVICE AND COMPUTER PROGRAM PRODUCT FOR MANAGING DATA BLOCKS" as a title, the contents and teachings of which are herein incorporated by reference in their entirety.

TECHNICAL FIELD

Embodiments of the present disclosure generally relate to the field of data storage, and in particular, to a method, an electronic device, and a computer program product for managing data blocks.

BACKGROUND

Typically, before storing data blocks to a storage device, a deduplication operation can be performed to avoid storing duplicate data blocks to the storage device. The deduplication operation is usually performed according to the following procedure. A fingerprint (e.g., a hash value) of a data block to be stored is first determined, and then the determined fingerprint is compared with fingerprints of data blocks already stored to the storage device. If the determined fingerprint does not match any of the fingerprints of the stored data blocks, it indicates that the data block to be stored is not a duplicate data block. If the determined fingerprint matches a fingerprint of a stored data block, the stored data block can be read from the storage device and decompressed to avoid a misjudgment caused by a collision of hash algorithms. By comparing the decompressed data block with the data block to be stored bit by bit, it is determined whether the two are duplicate data blocks. If it is determined that the data block to be stored is not a duplicate data block, the data block to be stored is compressed, and then the compressed data block is stored to the storage device.

SUMMARY OF THE INVENTION

The embodiments of the present disclosure provide a method, an electronic device, and a computer program product for managing data blocks.

In a first aspect of the present disclosure, a method for managing data blocks is provided. The method includes: generating, based on a first hash algorithm, a first fingerprint for a first data block to be stored to a storage device; if it is determined that there is a second fingerprint, in a fingerprint database, that is generated for a second data block based on the first hash algorithm and matches the first fingerprint, determining whether there is a third fingerprint, in the fingerprint database, that is generated for the second data block based on a second hash algorithm, wherein the fingerprint database records fingerprints for data blocks stored in the storage device; if it is determined that the third fingerprint exists in the fingerprint database, generating a fourth fingerprint for the first data block based on the second hash algorithm; and determining whether the first data block and the second data block are duplicate by comparing the third fingerprint and the fourth fingerprint.

In a second aspect of the present disclosure, an electronic device is provided. The electronic device includes at least one processing unit and at least one memory. The at least one memory is coupled to the at least one processing unit and stores instructions for execution by the at least one processing unit. The instructions, when executed by the at least one processing unit, cause an apparatus to perform actions including: generating, based on a first hash algorithm, a first fingerprint for a first data block to be stored to a storage device; if it is determined that there is a second fingerprint, in a fingerprint database, that is generated for a second data block based on the first hash algorithm and matches the first fingerprint, determining whether there is a third fingerprint, in the fingerprint database, that is generated for the second data block based on a second hash algorithm, wherein the fingerprint database records fingerprints for data blocks stored in the storage device; if it is determined that the third fingerprint exists in the fingerprint database, generating a fourth fingerprint for the first data block based on the second hash algorithm; and determining whether the first data block and the second data block are duplicate by comparing the third fingerprint and the fourth fingerprint.

In a third aspect of the present disclosure, a computer-readable storage medium having machine-executable instructions stored thereon is provided, wherein the machine-executable instructions, when executed by a device, cause the device to execute any of the steps of the method described above according to the first aspect.

In a fourth aspect of the present disclosure, a computer program product is provided. This computer program product is tangibly stored in a non-transitory computer storage medium and includes machine-executable instructions. The machine-executable instructions, when being executed by a device, cause this device to implement any step of the method described according to the first aspect of the present disclosure.

The Summary of the Invention section is provided in order to introduce the selection of concepts in a simplified form, which will be further described in the Detailed Description below. The Summary of the Invention section is not intended to identify key features or essential features of the present disclosure, nor is it intended to limit the scope of the present disclosure.

BRIEF DESCRIPTION OF THE DRAWINGS

The above and other objects, features, and advantages of the present disclosure will become more apparent by describing the example embodiments of the present disclosure in more detail in combination with the accompanying drawings. In the example embodiments of the present disclosure, the same reference numerals generally represent the same parts.

The same or corresponding reference numerals in the various drawings represent the same or corresponding portions.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. Although the preferred embodiments of the present disclosure are shown in the accompanying drawings, it should be understood that the present disclosure can be implemented in various forms and should not be limited by the embodiments set forth herein. Rather, these embodiments are provided to make the present disclosure more thorough and complete, and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "one example embodiment" and "one embodiment" mean "at least one example embodiment." The term "another embodiment" means "at least one further embodiment." The terms "first", "second", etc. may refer to different or the same objects. Other explicit and implicit definitions may also be included below.

As described above, before data is stored to a storage device, a deduplication operation can usually be performed to avoid storing duplicate data blocks to the storage device. The deduplication operation is usually performed according to the following procedure. A fingerprint (e.g., a hash value) of a data block to be stored is first determined, and then the determined fingerprint is compared with fingerprints of data blocks already stored to the storage device. If the determined fingerprint does not match any of the fingerprints of the stored data blocks, it indicates that the data block to be stored is not a duplicate data block. If the determined fingerprint matches a fingerprint of a stored data block, the stored data block can be read from the storage device and decompressed to avoid a misjudgment caused by a collision of hash algorithms. By comparing the decompressed data block with the data block to be stored bit by bit, it is determined whether the two are duplicate data blocks. If it is determined that the data block to be stored is not a duplicate data block, the data block to be stored is compressed, and then the compressed data block is stored to the storage device.

In the above conventional solution, when the determined fingerprint matches a fingerprint of a stored data block, to avoid a misjudgment caused by a collision of hash algorithms, a series of operations with great overhead need to be performed to identify whether the data block to be stored is a duplicate data block, thereby leading to reduced system performance.

The embodiments of the present disclosure propose a solution for managing data blocks to solve one or more of the above problem and other potential problems. In this solution, based on a first hash algorithm, a first fingerprint is generated for a first data block to be stored to a storage device. If it is determined that there is a second fingerprint, in a fingerprint database, that is generated for a second data block based on the first hash algorithm and matches the first fingerprint, it is determined whether there is a third fingerprint, in the fingerprint database, that is generated for the second data block based on a second hash algorithm, wherein the fingerprint database records fingerprints for data blocks stored in the storage device. If it is determined that the third fingerprint exists in the fingerprint database, a fourth fingerprint is generated for the first data block based on the second hash algorithm. Then, it is determined whether the first data block and the second data block are duplicate by comparing the third fingerprint and the fourth fingerprint. In this way, the embodiments of the present disclosure can effectively reduce the overhead of identifying duplicate data blocks in data deduplication.

Figure 1:
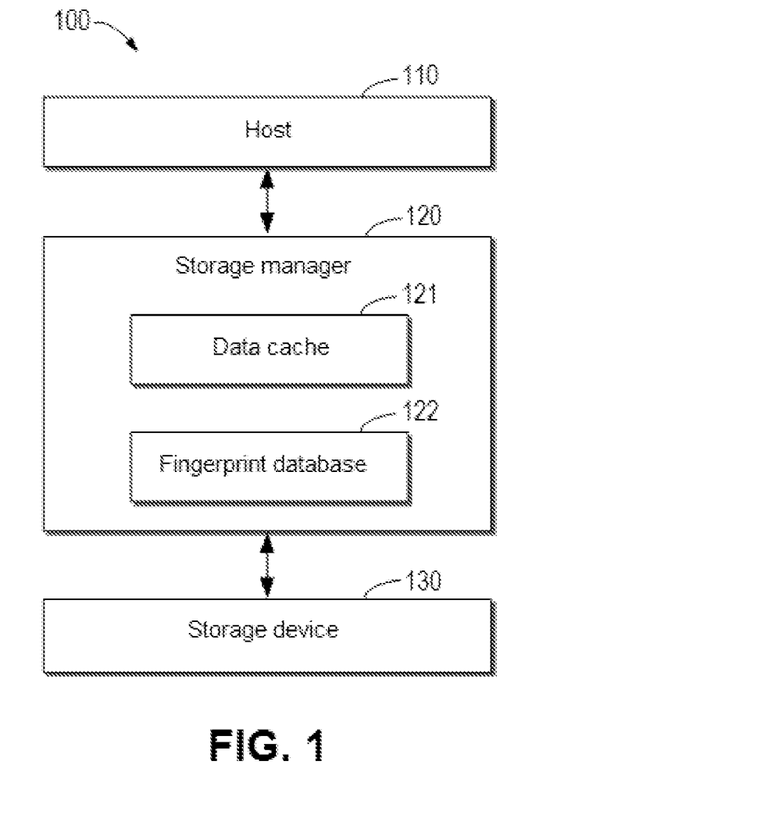
FIG. 1 illustrates a schematic diagram of an example system in which embodiments of the present disclosure can be implemented.

FIG. 1 illustrates a block diagram of example system 100 in which the embodiments of the present disclosure can be implemented. As shown in FIG. 1, system 100 includes host 110, storage manager 120, and storage device 130. It should be understood that the structure and function of system 100 are described for illustrative purpose only and do not imply any limitation to the scope of the present disclosure. For example, the embodiments of the present disclosure may also be applied to a system different from system 100.

In system 100, host 110 may be, for example, any physical computer, virtual machine, server, and the like that runs a user application. Host 110 can send an input/output (I/O) request to storage manager 120, for example, for reading data from storage device 130 and/or writing data to storage device 130. In response to receiving a read request from host 110, storage manager 120 can read data from storage device 130 and return the read data to host 110. In response to receiving a write request from host 110, storage manager 120 can write data to storage device 130. Storage device 130 may be any non-volatile storage medium currently known or to be developed in the future, such as a magnetic disk, a solid state disk (SSD), or a disk array.

As shown in FIG. 1, for example, storage manager 120 may include data cache 121 and fingerprint database 122. Data cache 121 can cache data to be written to storage device 130. For example, the data in data cache 121 can be organized in unit of pages (also referred to herein as "data blocks"), and the pages can be flushed to storage device 130 to achieve persistent storage of the data. The pages to be flushed to storage device 130 are also referred to as "dirty pages." Fingerprint database 122 can record fingerprints of pages that have been flushed to storage device 130, thereby avoiding duplicate pages from being written to storage device 130. The fingerprints may be hash values of the pages that are calculated based on predetermined hash algorithms. For example, for the same page, fingerprint database 122 can record one or more fingerprints generated based on one or more hash algorithms.

It should be understood that data cache 121 and/or fingerprint database 122 may be implemented using any currently known or to-be-developed volatile storage media, non-volatile storage media, or a combination of the two. In addition, data cache 121 and fingerprint database 122 can be implemented using identical or different storage media. The scope of the present disclosure is not limited in this regard.

Figure 2:
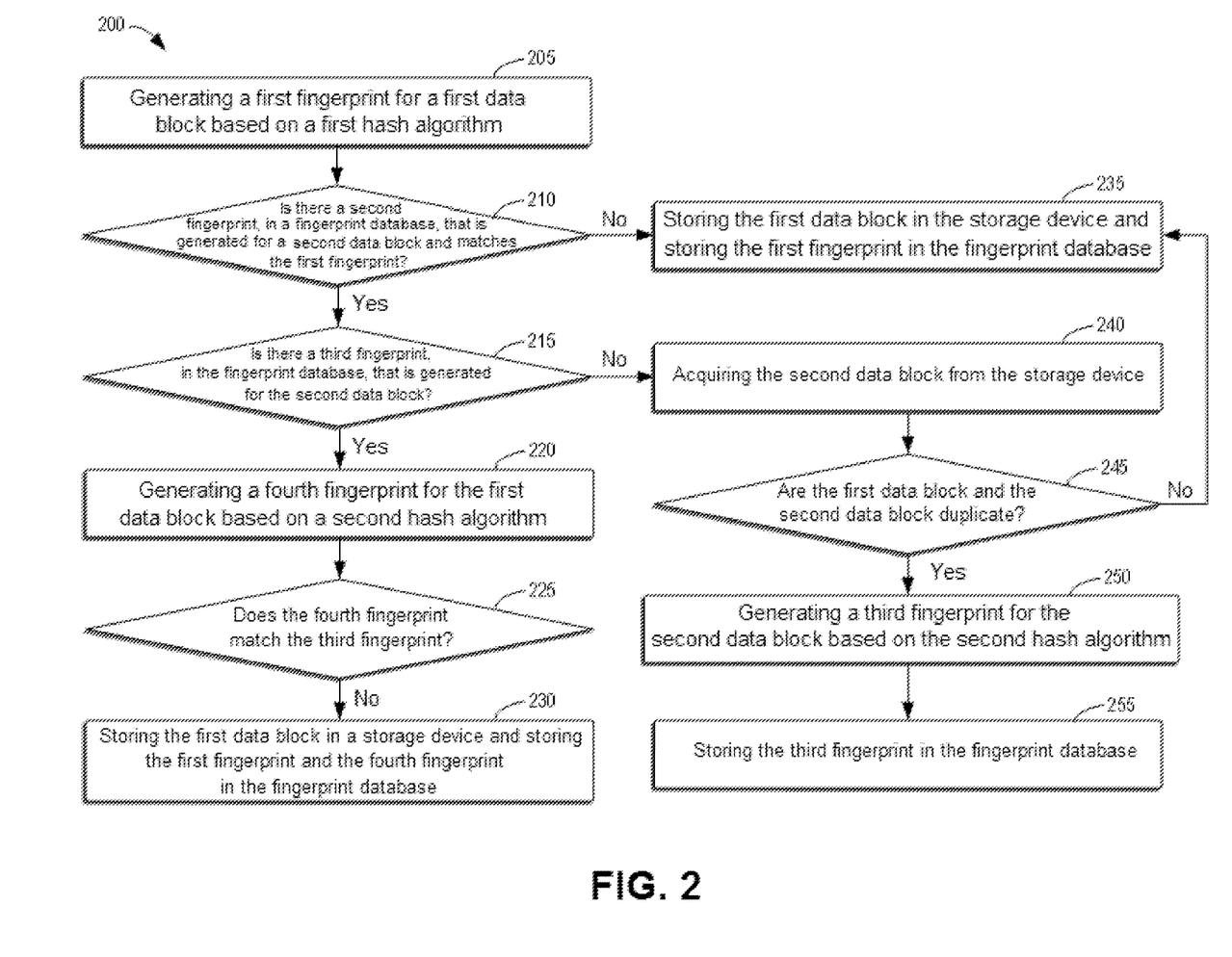
FIG. 2 illustrates a flow chart of an example method for managing data blocks according to an embodiment of the present disclosure.

FIG. 2 illustrates a flow chart of example method 200 for storing data according to an embodiment of the present disclosure. Method 200 may be executed, for example, by storage manager 120 as shown in FIG. 1. It should be understood that method 200 may also include additional actions not shown and/or may omit actions shown, and the scope of the present disclosure is not limited in this regard. Method 200 is described in detail below with reference to FIG. 1.

As shown in FIG. 2, at block 205, storage manager 120 generates, based on a first hash algorithm, a first fingerprint for a first data block to be stored in storage device 130. In some embodiments, the first hash algorithm may be, for example, a Murmur3 hash algorithm, or any other suitable hash algorithm.

At block 210, storage manager 120 searches fingerprint database 122 to determine whether there is a second fingerprint that is generated for a second data block based on the first hash algorithm and matches the first fingerprint.

If it is determined that there is no fingerprint matching the first fingerprint in fingerprint database 122, storage manager 120 can determine that the first data block is not a duplicate of any of the data blocks already stored in storage device 130. In this case, method 200 proceeds to block 235, where storage manager 120 stores the first data block to storage device 130, and stores the first fingerprint (the fingerprint generated based on the first hash algorithm) of the first data block in fingerprint database 122. In some embodiments, storage manager 120 can compress the first data block and then write the compressed first data block to storage device 130. In some other embodiments, the compression operation may be omitted.

If it is determined that there is a second fingerprint for a second data block, in fingerprint database 122, that matches the first fingerprint, at block 215, storage manager 120 determines whether there is a third fingerprint, in fingerprint database 122, that is generated for the second data block based on a second hash algorithm. The second hash algorithm can be any suitable hash algorithm with a lower collision probability than that of the first hash algorithm. "Collision" described here refers to a situation where two data blocks are different, but their hash values are the same. In some embodiments, for example, the second hash algorithm is a SHA-1 hash algorithm, which has approximately 3 times the computational overhead of the Murmur 3 algorithm but a much lower collision probability than the Murmur 3 algorithm (e.g., the collision probability of a 160-bit SHA-1 hash value is 0.00000000000019%).

If it is determined that the third fingerprint generated for the second data block based on the second hash algorithm exists in fingerprint database 122, at block 220, storage manager 120 generates a fourth fingerprint for the first data block based on the second hash algorithm. At block 225, storage manager 120 compares the third fingerprint and the fourth fingerprint to determine whether the two match.

If the third fingerprint matches the fourth fingerprint, since the collision probability of the SHA-1 algorithm is extremely low, storage manager 120 can determine that the first data block and the second data block are duplicate data blocks. In this case, storage manager 120 will not store the first data block to storage device 130 to avoid duplicate storage. In addition, since fingerprint database 122 already saves a fingerprint of the second data block, storage manager 120 will also not write the fingerprint of the first data block to fingerprint database 122. Compared with the conventional solution, identifying duplicate data blocks by comparing fingerprints generated based on different hash algorithms can avoid the operations of reading data blocks from the storage device and comparing them bit by bit, thus effectively reducing the overhead of identifying duplicate data blocks.

If the third fingerprint does not match the fourth fingerprint, storage manager 120 can determine that the first data block and the second data block are not duplicate. In this case, at block 230, storage manager 120 can store the first data block to storage device 130 and store the first fingerprint (i.e., the fingerprint generated based on the first hash algorithm) and the fourth fingerprint (i.e., the fingerprint generated based on the second hash algorithm) of the first data block in fingerprint database 122 for subsequent queries. In some embodiments, storage manager 120 can compress the first data block and then write the compressed first data block to storage device 130. In some other embodiments, the compression operation may be omitted.

If it is determined at block 215 that a third fingerprint generated for the second data block based on the second hash algorithm does not exist in fingerprint database 122, storage manager 120 will further determine whether the first data block and the second data block are duplicate in accordance with a conventional solution.

Specifically, at block 240, storage manager 120 acquires the second data block from storage device 130. If the acquired second data block is a compressed data block, storage manager 120 can decompress it. At block 245, storage manager 120 compares the first data block and the second data block bit by bit to determine whether the two are duplicate.

If it is determined that the first data block and the second data block are duplicate, at block 250, storage manager 120 can generate a third fingerprint for the second data block based on the second hash algorithm, and then at block 255, store the generated third fingerprint in fingerprint database 122 for subsequent searching. By delaying the computation of the third fingerprint (e.g., based on the SHA-1 algorithm) until the time point when the first data block and the second data block are determined as duplicate data blocks, the overhead of computing multiple fingerprints for duplicate data blocks can be avoided.

If it is determined that the first data block and the second data block are not duplicate, method 200 proceeds to block 235, where storage manager 120 stores the first data block to storage device 130 and stores the first fingerprint (the fingerprint generated based on the first hash algorithm) of the first data block in fingerprint database 122. In some embodiments, storage manager 120 can compress the first data block and then write the compressed first data block to storage device 130. In some other embodiments, the compression operation may be omitted.

Although FIG. 2 only describes generating fingerprints for data blocks based on at most two hash algorithms, it should be understood that the embodiments of the present disclosure can also be extended to identifying duplicate data blocks by comparing more fingerprints generated based on more than two hash algorithms. In addition, to resist malicious collision attacks, a private data header and/or data tail can be added to a data block before generating a fingerprint for the data block, and then a corresponding fingerprint can be generated based on a hash algorithm for the data block added with the data header and/or data tail.

As can be seen from the above description, the embodiments of the present disclosure propose a solution for managing data blocks to solve one or more of the above problem and other potential problems. In this solution, based on a first hash algorithm, a first fingerprint is generated for a first data block to be stored to a storage device. If it is determined that there is a second fingerprint, in a fingerprint database, that is generated for a second data block based on the first hash algorithm and matches the first fingerprint, it is determined whether there is a third fingerprint, in the fingerprint database, that is generated for the second data block based on a second hash algorithm, wherein the fingerprint database records fingerprints for data blocks stored in the storage device. If it is determined that the third fingerprint exists in the fingerprint database, a fourth fingerprint is generated for the first data block based on the second hash algorithm. Then, it is determined whether the first data block and the second data block are duplicate by comparing the third fingerprint and the fourth fingerprint. Compared with the conventional solution, in the embodiments of the present disclosure, identifying duplicate data blocks by comparing fingerprints generated based on different hash algorithms can avoid operations of reading data blocks from a storage device and comparing them bit by bit, thus effectively reducing the overhead of identifying duplicate data blocks.

Figure 3:
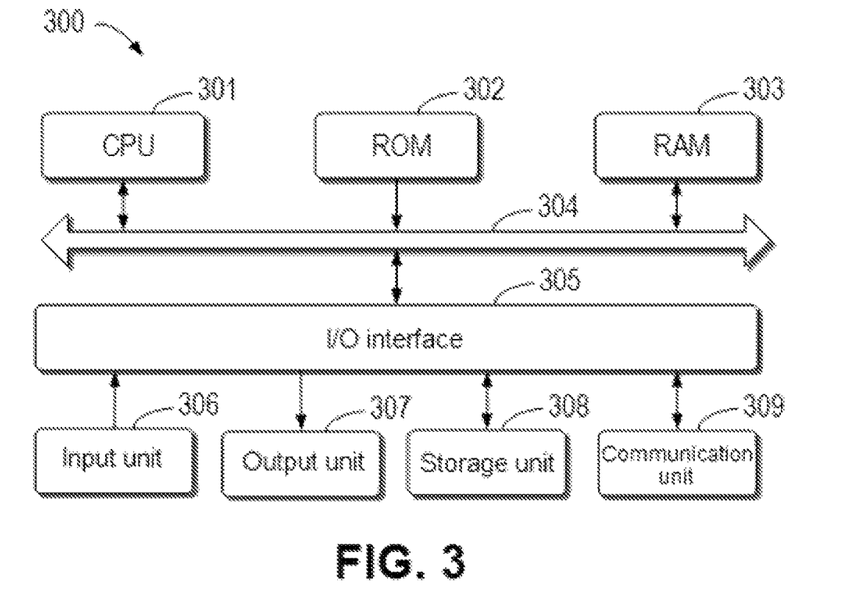
FIG. 3 illustrates a schematic block diagram of an example device that can be used to implement the embodiments of the present disclosure.

FIG. 3 illustrates a schematic block diagram of example device 300 that can be used to implement the embodiments of the present disclosure. For example, storage manager 120 as shown in FIG. 1 can be implemented by device 300. As shown in FIG. 3, device 300 includes central processing unit (CPU) 301 that may perform various appropriate actions and processing according to computer program instructions stored in read-only memory (ROM) 302 or computer program instructions loaded from storage unit 308 into random access memory (RAM) 303. In RAM 303, various programs and data required for the operation of storage device 300 may also be stored. CPU 301, ROM 302, and RAM 303 are connected to each other through bus 304. Input/output (I/O) interface 305 is also connected to bus 304.

A plurality of components in device 300 are connected to I/O interface 305, including: input unit 306, such as a keyboard and a mouse; output unit 307, such as various types of displays and speakers; storage unit 308, such as a magnetic disk and an optical disc; and communication unit 309, such as a network card, a modem, and a wireless communication transceiver. Communication unit 309 allows device 300 to exchange information/data with other devices via a computer network such as the Internet and/or various telecommunication networks.

The various processes and processing described above, such as method 200, may be performed by processing unit 301. For example, in some embodiments, method 200 may be implemented as a computer software program that is tangibly included in a machine-readable medium, such as storage unit 308. In some embodiments, part or all of the computer program may be loaded into and/or installed onto device 300 via ROM 302 and/or communication unit 309. One or more actions of method 200 described above may be performed when the computer program is loaded into RAM 303 and executed by CPU 301.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction execution device. For example, the computer-readable storage medium may be, but is not limited to, an electrical storage device, a magnetic storage device, an optical storage device, an electromagnetic storage device, a semiconductor storage device, or any appropriate combination thereof. More specific examples (a non-exhaustive list) of computer-readable storage media include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. Computer-readable storage media used herein are not to be interpreted as transient signals per se, such as radio waves or other freely propagating electromagnetic waves, electromagnetic waves propagating through waveguides or other transmission media (for example, light pulses through fiber optic cables), or electrical signals transmitted via electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source or object code written in any combination of one or more programming languages, wherein the programming languages include object-oriented programming languages, such as Smalltalk and C++, and conventional procedural programming languages, such as the C language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, for example, a programmable logic circuit, a field programmable gate array (FPGA), or a programmable logic array (PLA), is personalized by utilizing state information of the computer-readable program instructions, wherein the electronic circuit may execute computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or block diagrams and combinations of blocks in the flow charts and/or block diagrams can be implemented by computer-readable program instructions.

These computer-readable program instructions can be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms used herein is intended to best explain the principles and practical applications of the embodiments or the improvements to technologies on the market, or to enable other persons of ordinary skill in the art to understand the embodiments disclosed herein.

The invention claimed is:

1. A method for managing data blocks, comprising:
generating, based on a first hash algorithm, a first fingerprint for a first data block to be stored to a storage device;
if it is determined that there is a second fingerprint, in a fingerprint database, that is generated for a second data block based on the first hash algorithm and matches the first fingerprint, determining whether there is a third fingerprint, in the fingerprint database, that is generated for the second data block based on a second hash algorithm, wherein the fingerprint database records fingerprints for data blocks stored in the storage device;
if it is determined that the third fingerprint exists in the fingerprint database, generating a fourth fingerprint for the first data block based on the second hash algorithm;
determining whether the first data block and the second data block are duplicate by comparing the third fingerprint and the fourth fingerprint; and
prior to generating the first fingerprint, generating the third fingerprint based on the second hash algorithm and storing the third fingerprint in the fingerprint database; and
wherein determining whether there is the third fingerprint includes querying the fingerprint database for the third fingerprint, wherein it is determined that the third fingerprint exists in the fingerprint database.

2. The method according to claim 1, further comprising:
generating, based on the first hash algorithm, a new fingerprint for a new data block to be stored to the storage device;
determining that no fingerprint matching the new fingerprint exists in the fingerprint database;
if it is determined that no fingerprint matching the new fingerprint exists in the fingerprint database,
storing the new data block in the storage device; and
storing the new fingerprint in the fingerprint database.

3. The method according to claim 1, further comprising:
generating, based on the first hash algorithm, a new fingerprint for a new data block to be stored to the storage device;
determining that there is an existing fingerprint, in a fingerprint database, that is generated for a stored data block based on the first hash algorithm and matches the new fingerprint,
determining that another fingerprint that is generated for the stored data block based on the second hash algorithm does not exist in the fingerprint database;
if it is determined that the another fingerprint does not exist in the fingerprint database, acquiring the stored data block from the storage device; and
determining whether the new data block and the stored data block are duplicate by comparing the new data block and the stored data block.

4. The method according to claim 3, wherein determining whether the new data block and the stored data block are duplicate includes determining that the new data block and the stored data block are duplicate;
wherein the method further comprises:
if it is determined that the new data block and the stored data block are duplicate, generating the another fingerprint for the stored data block based on the second hash algorithm; and storing the another fingerprint in the fingerprint database.

5. The method according to claim 3, wherein determining whether the new data block and the stored data block are duplicate includes determining that the new data block and the stored data block are not duplicate;

wherein the method further comprises:
if it is determined that the new data block and the stored data block are not duplicate,
storing the new data block in the storage device; and
storing the new fingerprint in the fingerprint database.

6. The method according to claim 1, wherein determining whether the first data block and the second data block are duplicate includes:
if the third fingerprint matches the fourth fingerprint, determining that the first data block and the second data block are duplicate; and
if the third fingerprint does not match the fourth fingerprint, determining that the first data block and the second data block are not duplicate.

7. The method according to claim 6, further comprising:
if it is determined that the first data block and the second data block are not duplicate,
storing the first data block in the storage device; and
storing the first fingerprint and the fourth fingerprint in the fingerprint database.

8. The method according to claim 1, wherein a collision probability of the second hash algorithm is lower than a collision probability of the first hash algorithm.

9. The method according to claim 1, wherein the first hash algorithm is a Murmur3 hash algorithm, and the second hash algorithm is a SHA-1 hash algorithm.

10. An electronic device, comprising:
at least one processing unit; and
at least one memory that is coupled to the at least one processing unit and stores instructions for execution by the at least one processing unit, wherein the instructions, when executed by the at least one processing unit, cause the electronic device to perform actions including:
generating, based on a first hash algorithm, a first fingerprint for a first data block to be stored to a storage device;
if it is determined that there is a second fingerprint, in a fingerprint database, that is generated for a second data block based on the first hash algorithm and matches the first fingerprint, determining whether there is a third fingerprint, in the fingerprint database, that is generated for the second data block based on a second hash algorithm, wherein the fingerprint database records fingerprints for data blocks stored in the storage device;
if it is determined that the third fingerprint exists in the fingerprint database, generating a fourth fingerprint for the first data block based on the second hash algorithm;
determining whether the first data block and the second data block are duplicate by comparing the third fingerprint and the fourth fingerprint; and
prior to generating the first fingerprint, generating the third fingerprint based on the second hash algorithm and storing the third fingerprint in the fingerprint database; and
wherein determining whether there is the third fingerprint includes querying the fingerprint database for the third fingerprint, wherein it is determined that the third fingerprint exists in the fingerprint database.

11. The electronic device according to claim 10, wherein the actions further include:
generating, based on the first hash algorithm, a new fingerprint for a new data block to be stored to the storage device;
determining that no fingerprint matching the new fingerprint exists in the fingerprint database;
if it is determined that no fingerprint matching the new fingerprint exists in the fingerprint database,
storing the new data block in the storage device; and
storing the new fingerprint in the fingerprint database.

12. The electronic device according to claim 10, wherein the actions further include:
generating, based on the first hash algorithm, a new fingerprint for a new data block to be stored to the storage device;
determining that there is an existing fingerprint, in a fingerprint database, that is generated for a stored data block based on the first hash algorithm and matches the new fingerprint,
determining that another fingerprint that is generated for the stored data block based on the second hash algorithm does not exist in the fingerprint database;
if it is determined that the another fingerprint does not exist in the fingerprint database, acquiring the stored data block from the storage device; and
determining whether the new data block and the stored data block are duplicate by comparing the new data block and the stored data block.

13. The electronic device according to claim 12, wherein determining whether the new data block and the stored data block are duplicate includes determining that the new data block and the stored data block are duplicate;
wherein the actions further include:
if it is determined that the new data block and the stored data block are duplicate,
generating the another fingerprint for the stored data block based on the second hash algorithm; and
storing the another fingerprint in the fingerprint database.

14. The electronic device according to claim 12, wherein determining whether the new data block and the stored data block are duplicate includes determining that the new data block and the stored data block are not duplicate;
wherein the actions further include:
if it is determined that the new data block and the stored data block are not duplicate,
storing the new data block in the storage device; and
storing the new fingerprint in the fingerprint database.

15. The electronic device according to claim 10, wherein determining whether the first data block and the second data block are duplicate includes:
if the third fingerprint matches the fourth fingerprint, determining that the first data block and the second data block are duplicate; and
if the third fingerprint does not match the fourth fingerprint, determining that the first data block and the second data block are not duplicate.

16. The electronic device according to claim 15, wherein the actions further include:
if it is determined that the first data block and the second data block are not duplicate,
storing the first data block in the storage device; and
storing the first fingerprint and the fourth fingerprint in the fingerprint database.

17. The electronic device according to claim 10, wherein a collision probability of the second hash algorithm is lower than a collision probability of the first hash algorithm.

18. The electronic device according to claim 10, wherein the first hash algorithm is a Murmur3 hash algorithm, and the second hash algorithm is a SHA-1 hash algorithm.

19. A computer program product having a non-transitory computer readable medium which stores a set of instructions to manage data blocks; the set of instructions, when carried out by computerized circuitry, causing the computerized circuitry to perform a method of:
generating, based on a first hash algorithm, a first fingerprint for a first data block to be stored to a storage device;
if it is determined that there is a second fingerprint, in a fingerprint database, that is generated for a second data block based on the first hash algorithm and matches the first fingerprint, determining whether there is a third fingerprint, in the fingerprint database, that is generated for the second data block based on a second hash algorithm, wherein the fingerprint database records fingerprints for data blocks stored in the storage device;
if it is determined that the third fingerprint exists in the fingerprint database, generating a fourth fingerprint for the first data block based on the second hash algorithm;
determining whether the first data block and the second data block are duplicate by comparing the third fingerprint and the fourth fingerprint; and
prior to generating the first fingerprint, generating the third fingerprint based on the second hash algorithm and storing the third fingerprint in the fingerprint database; and
wherein determining whether there is the third fingerprint includes querying the fingerprint database for the third fingerprint, wherein it is determined that the third fingerprint exists in the fingerprint database.

20. The method according to claim 1, further comprising:
after generating the first fingerprint, performing a search operation that identifies whether any fingerprint from a plurality of fingerprints in the fingerprint database matches the first fingerprint, each of the plurality of fingerprints generated for a respective data block stored in the storage device; and
in response to performing the search operation, determining that there is the second fingerprint, in the fingerprint database, that is generated for the second data block based on the first hash algorithm and matches the first fingerprint.

21. A method for managing data blocks, comprising:
generating, based on a first hash algorithm, a first fingerprint for a first data block to be stored to a storage device;
if it is determined that there is a second fingerprint, in a fingerprint database, that is generated for a second data block based on the first hash algorithm and matches the first fingerprint, determining whether there is a third fingerprint, in the fingerprint database, that is generated for the second data block based on a second hash algorithm, wherein the fingerprint database records fingerprints for data blocks stored in the storage device;
if it is determined that the third fingerprint exists in the fingerprint database, generating a fourth fingerprint for the first data block based on the second hash algorithm;
determining whether the first data block and the second data block are duplicate by comparing the third fingerprint and the fourth fingerprint;
generating, based on the first hash algorithm, a new fingerprint for a new data block to be stored to the storage device;
determining that there is an existing fingerprint, in a fingerprint database, that is generated for a stored data block based on the first hash algorithm and matches the new fingerprint,
determining that another fingerprint that is generated for the stored data block based on the second hash algorithm does not exist in the fingerprint database;
if it is determined that the another fingerprint does not exist in the fingerprint database, acquiring the stored data block from the storage device; and
determining whether the new data block and the stored data block are duplicate by comparing the new data block and the stored data block.

22. A method for managing data blocks, comprising:
generating, based on a first hash algorithm, a first fingerprint for a first data block to be stored to a storage device;
if it is determined that there is a second fingerprint, in a fingerprint database, that is generated for a second data block based on the first hash algorithm and matches the first fingerprint, determining whether there is a third fingerprint, in the fingerprint database, that is generated for the second data block based on a second hash algorithm, wherein the fingerprint database records fingerprints for data blocks stored in the storage device;
if it is determined that the third fingerprint exists in the fingerprint database, generating a fourth fingerprint for the first data block based on the second hash algorithm;
determining whether the first data block and the second data block are duplicate by comparing the third fingerprint and the fourth fingerprint;
after generating the first fingerprint, performing a search operation that identifies whether any fingerprint from a plurality of fingerprints in the fingerprint database matches the first fingerprint, each of the plurality of fingerprints generated for a respective data block stored in the storage device; and
in response to performing the search operation, determining that there is the second fingerprint, in the fingerprint database, that is generated for the second data block based on the first hash algorithm and matches the first fingerprint.

* * * * *